United States Patent [19]
Fawcett

[11] 4,238,974
[45] Dec. 16, 1980

[54] UNIVERSAL SEAL AND SUPPORT GUIDE FOR PUSH-PULL CABLE TERMINALS

[75] Inventor: Harry E. Fawcett, Tacoma, Wash.

[73] Assignee: Cablecraft, Inc., Tacoma, Wash.

[21] Appl. No.: 92,860

[22] Filed: Nov. 9, 1979

Related U.S. Application Data

[63] Continuation-in-part of Ser. No. 968,435, Dec. 11, 1978, abandoned.

[51] Int. Cl.$^3$ .................................................. F16C 1/10
[52] U.S. Cl. ................................ 74/501 R; 74/501 P; 403/122
[58] Field of Search ..................... 74/501 R, 501 P; 403/114, 122; 285/261

[56] References Cited

U.S. PATENT DOCUMENTS

| | | | |
|---|---|---|---|
| 2,730,134 | 1/1956 | Morse | 74/501 |
| 3,013,443 | 12/1961 | Morse | 74/501 |
| 3,320,665 | 5/1967 | Morse | 74/501 |

*Primary Examiner*—Kenneth Dorner

*Attorney, Agent, or Firm*—Christensen, O'Connor, Johnson & Kindness

[57] ABSTRACT

A flexure-limiting tubular ball and socket universal joint device protectively supports and guides the inner or center cable of a coaxial push-pull cable assembly while providing a seal effective to exclude dirt and moisture in the variously deflected positions of the inner member and its load-connected extension rod fitting. The cable inner member extension rod fitting passes through a support tube and a sliding seal therein, the support tube having at one end a hollow ball-shaped element that snaps into a mating socket element on a socket tube of resilient plastic material. The socket tube with the ball element retained in the socket element is then inserted longitudinally into a receptacle formed in a tubular terminal member on the outer cable. In the fully inserted position, the snug fit between the socket tube forms a seal, not only with the ball element within it but with the surrounding wall of the tubular fitting receptacle; moreover, the universal joint ball element is then permanently retained within the closely collared socket element, and with the socket tube in its fully inserted position being locked in the receptacle, a rugged protective universal joint and seal is formed.

14 Claims, 8 Drawing Figures

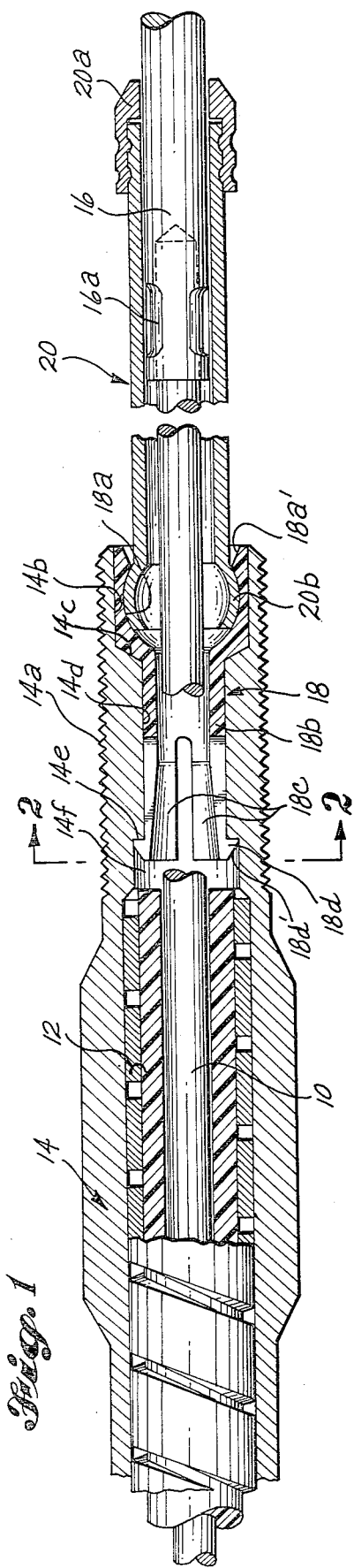
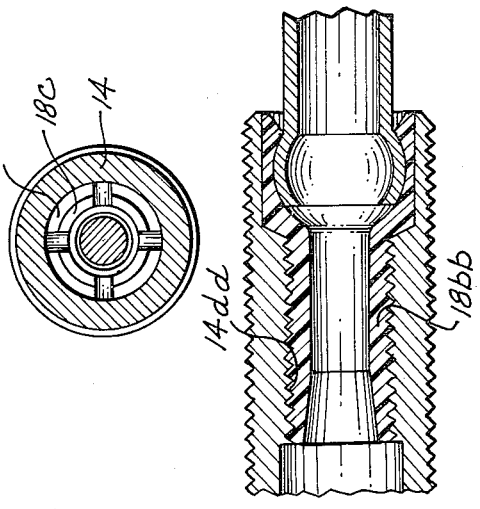
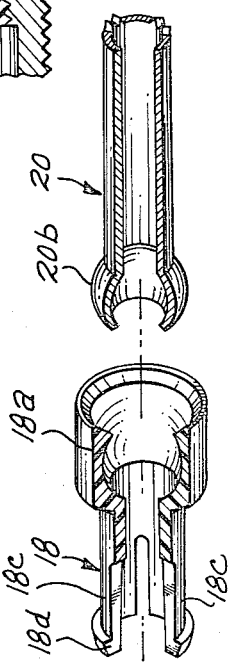
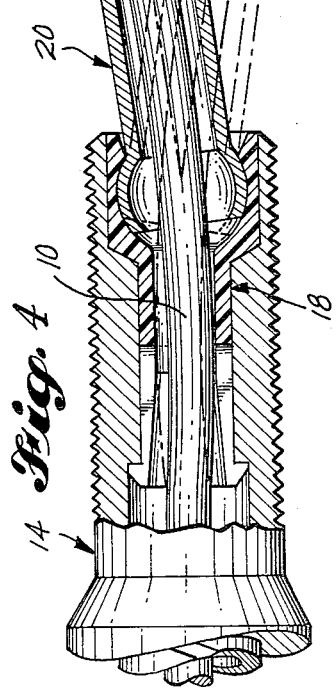
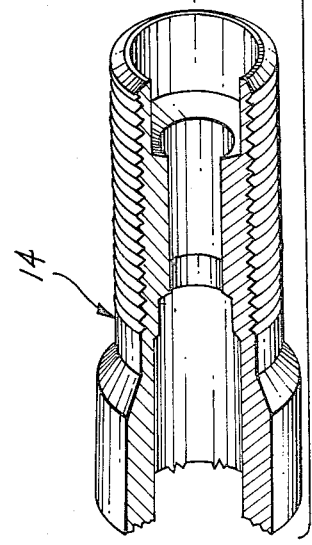

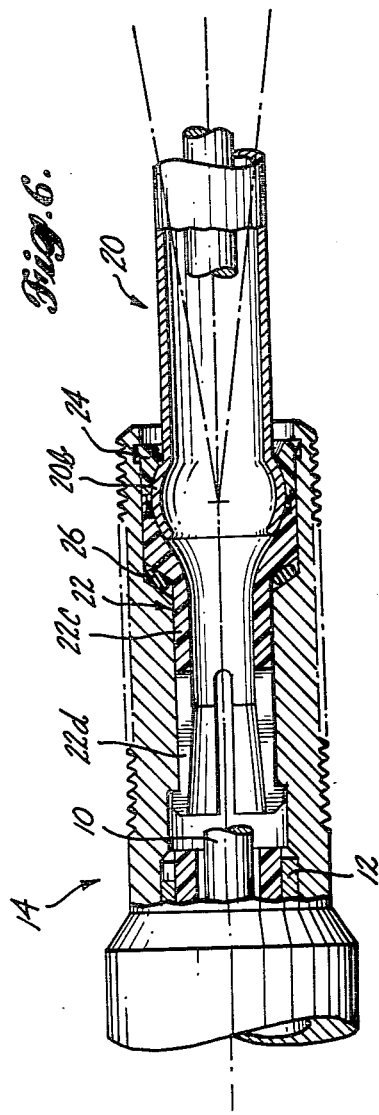
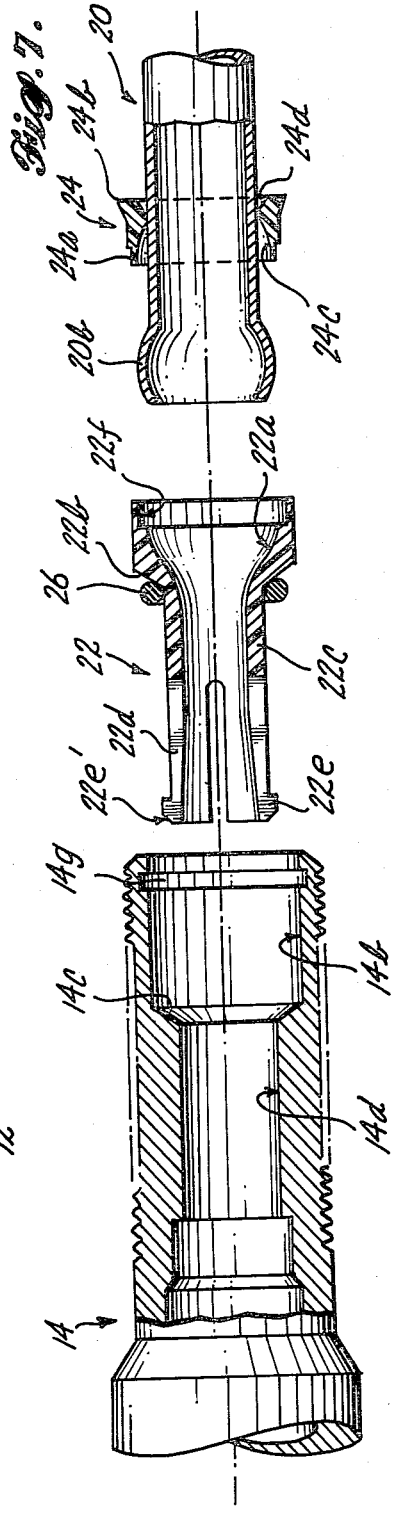
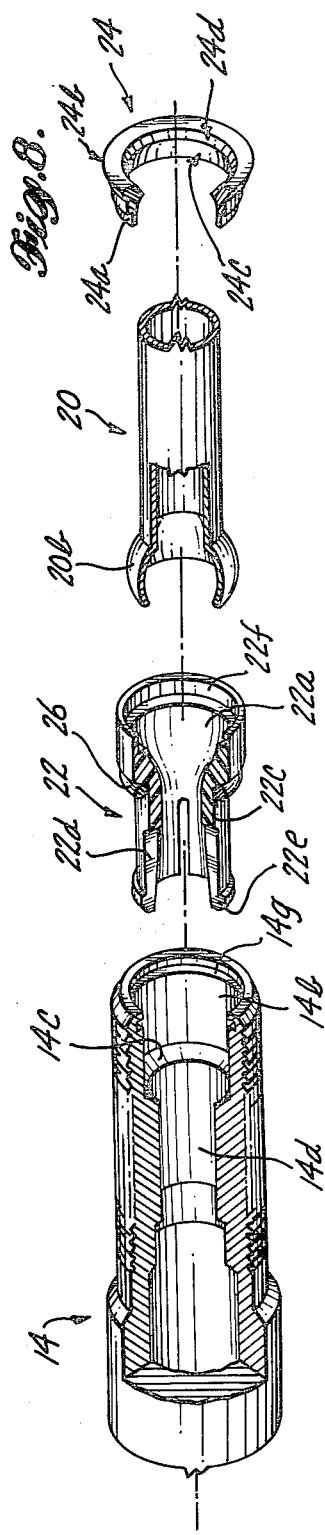

UNIVERSAL SEAL AND SUPPORT GUIDE FOR PUSH-PULL CABLE TERMINALS

CROSS-REFERENCE TO RELATED APPLICATION

This application is a continuation-in-part of application Ser. No. 968,435 filed Dec. 11, 1978 now abandoned.

BACKGROUND OF INVENTION

The present invention relates to improvements in sealed universal pivot joints for push-pull cable terminal assemblies and is herein illustratively described by reference to the presently preferred embodiments thereof. However, it will be recognized that certain modifications and changes therein with respect to details may be made without departing from the essential features involved.

Flexible push-pull coaxial cables used in a wide variety of remote control applications comprise flexible inner and outer coaxial cable members with suitable terminal fittings on the ends of the respective members. At one or both ends of the cable assembly, the projecting end of the inner cable member carries a rod-like extension fitting that serves as a load coupler that, together with the connected immediately adjoining portion of the center cable, requires both support and guidance, as well as a means to effect a seal around the same and around the cable so that dirt and moisture cannot enter the cable assembly. Such a guiding support and seal means capable of functioning as a universal joint in order to accommodate the variously deflected positions which the load coupler rod may have to assume under operating conditions, must satisfy certain practical requirements as well as the functional ones mentioned. To be commercially practicable, the device must be relatively inexpensive to manufacture, easily assembled, sturdy and durable. In many applications, the cable assembly operates to perform cyclic control functions literally thousands of times within an operating lifespan. Oftentimes, load forces and moment couples reacting on the cable members and fitting assemblies are severe and are imposed during each operating cycle and with the end fittings laterally deflected out of coaxial alignment with the anchored terminal fitting of the outer cable member. It is therefore important to permit the inner cable member and its extension rod fitting to flex as required and yet to protectively limit the degree of flexure so as to minimize fatigue failures as well as maintain the integrity of the cable assembly seals.

A broad object of this invention is to provide an improved guiding support and seal means for coaxial cable assemblies solving the foregoing problems in an economic and practicable manner suitable for commercial use. More specifically, it is an object hereof to provide a readily manufactured and assembled device, and a sturdy and durable wear-resistant device of the nature indicated.

A further object of this invention is to provide such a device, the parts of which are few and simple and may be manufactured as relatively low cost with the necessary degree of dimensional precision so as to provide an effective durable seal without complicating the steps required to assemble the mechanism.

SUMMARY OF INVENTION

In accordance with the concepts of this invention, the load coupler extension rod of the inner cable member passes through a sliding seal in one end of a support tube. The support tube carries a hollow ball coupler element on its opposite end that is engaged in a tubular socket element on one end of a resilient plastic socket tube through which the inner cable member also passes. With the ball and socket elements thus interengaged, the socket tube is inserted into the open end of a receptacle in a terminal tubular fitting on the outer cable member. The parts fit snugly so that upon completion of such insertion, a seal is formed around the socket tube and also between the ball and socket elements. Close collaring of the installed socket tube socket element precludes its expansion and thereby snugly requires it to retentively hold the support tube. A positive interlock between the inserted socket tube and the tubular terminal fitting securely holds together these components.

Additional features of the assembly comprising the invention will appear more fully as the description proceeds with reference to the accompanying drawings.

BRIEF DESCRIPTION OF DRAWINGS

FIG. 1 is a longitudinal sectional view of one end of a push-pull coaxial cable assembly embodying the preferred embodiment of the invention.

FIG. 2 is a transverse sectional view taken on line 2—2 in FIG. 1.

FIG. 3 is an exploded view of the three principal parts that interfit in forming the protective universal seal and joint comprising the preferred embodiment.

FIG. 4 is a fragmentary longitudinal sectional view illustrating limited deflectability of the ball and socket joint and associated components comprising the invention.

FIG. 5 is a fragmentary longitudinal sectional view illustrating a first alternative embodiment of the invention.

FIG. 6 is a fragmentary longitudinal sectional view illustrating a second alternative embodiment of the invention.

FIG. 7 is an exploded view of the second alternative embodiment of FIG. 6.

FIG. 8 is an isometric exploded view of the second alternative embodiment of FIG. 6.

DESCRIPTION OF THE PREFERRED EMBODIMENT

Referring to the drawings, wherein like reference characters designate like or corresponding elements throughout the several views, the push-pull coaxial cable components are illustrated in somewhat simplified form and are or may be conventional, including the flexible multi-strand cable inner member 10 and the wrapped multi-strand cable outer member 12 in which the inner member is received and guided for longitudinal relative sliding movement in the usual manner.

Referring to FIGS. 1 through 4 in particular, the preferred embodiment includes a tubular terminal fitting 14 fixed on the end of the outer member 12 has a threaded cylindrical tip 14a by which it may be anchored with use of lock nuts to a panel or other support (not shown) through which it passes in the usual manner. Inner member 10 projects axially outward from the fitting 14 and carries a rod-like load coupler extension fitting 16 thereon for transmitting load forces through the cable assembly. Rod 16 is swaged at 16a on the end of inner member 10.

The open end of tubular fitting 14 forms a receptacle comprising a substantially cylindrical entrance chamber 14b adjoined through a steeply sloped annular shoulder 14c to a substantially cylindrical elongated intermediate chamber 14d. At the inner end of chamber 14d the receptacle undergoes an abrupt expansion to form an annular locking shoulder 14e and an inner chamber 14f. Longitudinally insertable with a snug conforming fit into the open fitting receptacle is a socket tube 18 including at one end a socket element 18a that fits into the outer chamber 14b, and a cylindrical shank 18b that fits within the intermediate chamber 14d. Shank 18b itself terminates at its inner end in a multiply-slotted portion forming a circumferentially spaced group of resiliently deflectable fingers 18c that carry transversely projecting locking tabs 18d, the tips of which are chamferred at 18d' for ease of entry by inward wedging action against the inner edge of annular shoulder 14c during the insertion process. When the socket tube 18 is fully inserted in the receptacle of fitting 14 the fingers are free to snap outwardly, positioning the locking tabs 18d in direct abutment with the locking shoulder 14e so as to prevent retraction of the socket tube. Being of resilient plastic material, the socket tube also has a degree of surface softness or elastic yield so as to enhance its sealing effect in snug fitting contact with the interior wall of the tubular fitting outer chamber as shown.

In order to provide support and guidance for the cable rod 16, the assembly includes a support tube 20, preferably of metal, such as stainless steel, carrying a seal element 20a on its outer end that effects a sliding seal with the rod 16 passing through it. The opposite end of the support tube 20 carries a tubular ball element 20b that can be inserted by snap action into the socket element 18a before the socket tube 18 is inserted into the fitting 14. Once the socket tube 18 is fully so inserted however, the closely collared socket element 18a cannot expand and thus retentively holds the ball element 20b, yet permitting the support tube 20 to undergo universal tilting or deflection movement relative to the socket tube 18. The degree of deflection permitted in any plane is limited by stop surfaces including a conically reentrant annular end face 18a' on the socket element 18a adapted to bear against a support tube surface, namely the cylindrical outer wall of the support tube 20. This is depicted in FIG. 4 wherein a maximum limited deflection angle of 16° between opposite limits is indicated.

In FIG. 3 the interfittable parts are shown separated. Assembly is effected by first snapping the ball 20b into the socket 18a and thereupon by longitudinally inserting the socket tube 18 into the receptacle of fitting 14 until it is fully inserted and the locking tabs 18d snap outwardly past the locking shoulder 14e to complete the assembly.

An first alternative embodiment is shown in FIG. 5, wherein the parts are similar except, in this case, the resilient fingers with locking tabs are replaced by use of screw threads 18bb formed on the exterior of the socket tube shank portion 18b engageable with matching screw threads 14dd formed on the cylindrical wall of the intermediate chamber.

A second alternative embodiment is illustrated in FIGS. 6 through 8, wherein elements essentially identical to elements of the preferred embodiment are similarly numbered. In this alternative embodiment, a modified socket tube 22 and a cooperable lock ring 24 substitute for the single-piece socket tube 18 of the preferred embodiment. The complemental parts 22 and 24 are more readily moldable with present plastic molding technology than the one-piece socket tube 18 due to the internally divergent-convergent surface form of the latter. The modified socket tube 22 includes a semispherical socket portion 22a having a lap joint surface 22f along its outer rim. The lock ring 24 also includes a lap joint surface 24a which is cooperably engageable with the socket tube lap joint surface 22f to form a two-piece socket element essentially equivalent in function to the single-piece socket element 18a of the preferred embodiment. The lock ring 24 also includes an annular, spherically curved socket surface 24c which is cooperable with the socket portion 22a of the modified socket tube 22 to form the spherical, two-piece socket element. The lock ring 24 further includes an outwardly flanged edge 24b which retentively engages an annular groove 14g in the interior wall of the fitting 14 when the ring 24, socket tube 22 and O-ring 26 are installed in the fitting 14. A conically reentrant stop surface 24d is essentially equivalent in function to the similarly formed end face 18a' of the preferred embodiment.

The modified socket tube 22 further includes a shank portion 22c, deflectable fingers 22d, and locking tabs 22e with chamferred edges 22e', all of which are essentially identical to the corresponding elements of the preferred embodiment.

An elastomeric O-ring 26 is positioned between the sloped annular shoulder 14c of the fitting 14 and a cooperable annular shoulder 22b of the modified socket tube 22. The O-ring 26 exerts axial compressional force to maintain the two-piece socket element parts pressed together as an integral retainer for the ball element 20b of the support tube 20.

The above-described alternative embodiment is particularly adaptable to fabrication according to well-known methods of plastic molding and is thus particularly economical to produce. Moreover, the O-ring 26 and retentively engaged lock ring 24 provide a two-piece socket assembly which is retentively engaged at both ends and resiliently tensioned against disengagement due to longitudinal forces exerted on the support tube 20.

Inasmuch as the interfittable parts are readily formed with precision, the socket tube 18 by a precision plastic molding process and the support tube 20 by a precision dye-casting or forming process (being formed of metal) snug precision fits are readily achieved to form an effective and durable seal. Limited deflectability of the support tube 20 as shown in FIG. 4 protects the cable inner member 10 against undue load stress and undue deflection. The support for the socket tube socket element provided by the terminal fitting 14 assures a continuing seal between the parts even with the parts under load stress in their deflection-limit positions wherein the deflection leverage forces must be borne by the elements carrying the deflection limit stop surfaces described. The entire assembly is manufacturable at low costs on a production basis and very quickly assembled without any special skills required.

These and other aspects of the invention will become evident to those skilled in the art based on the foregoing description of the presently preferred embodiment which are illustrative of the novel concepts and features involved.

The embodiments of the invention in which an exclusive property or privilege is claimed are defined as follows:

1. In combination with a flexible coaxial push-pull cable including coaxial outer and inner cable members, said outer cable member having a terminal tubular fitting thereon, said tubular fitting having an open-end receptacle through which said inner cable member passes, said inner cable member projecting axially beyond said terminal tubular fitting and having a terminal rod-like extension fitting thereon, said inner cable member being longitudinally slidable in said outer cable member to project by varying distances beyond said tubular fitting and being subject to bending flexure relative thereto,
  a resiliently deformable socket tube having a shank portion and having on one end socket means forming a hollow ball-and-socket joint socket element,
  a support tube slidably engaging said rod-like fitting, said support tube having on one end a hollow ball-and-socket joint ball element retentively engageable in said socket means in universally pivotal sealed relationship therewith,
  said open-end receptacle of said terminal tubular fitting being formed and dimensioned to snugly receive by longitudinal insertion said socket tube including said shank portion and said socket means thereof with said ball element retained by said socket means, whereby said terminal tubular fitting forms a seal with said socket tube and prevents expansion of said socket means under attempted dislodgement force applied to said support tube relative to said socket tube,
  said support tube and said socket tube having cooperable stop surfaces interengageable upon predetermined angular movement of said support tube out of coaxial alignment with said socket tube so as to limit flexure of said cable inner member.

2. The combination defined in claim 1 wherein said socket means comprises a semispherical socket element integrally disposed at one end of said shank portion of said socket tube, and wherein said ball-and-socket ball element is retentively engageable in said socket element by forcibly snapping said ball element into said socket element.

3. The combination defined in claim 2 wherein said socket element stop surface comprises a substantially conical reentrant end surface on said socket element, and said support tube stop surface comprises an annular exterior wall surface of said support tube.

4. The combination defined in claim 3 wherein said shank portion of said socket tube has an end portion opposite said socket element comprising a plurality of circumferentially spaced substantially longitudinally projecting resiliently deflectable fingers, the interior of said terminal tubular fitting and the projecting ends of said fingers having cooperable locking elements interengageable by said insertion of the socket tube into said terminal tubular fitting to thereby lock the same together.

5. The combination defined in claim 4 wherein said cooperable locking elements include a transverse annular shoulder formed in said terminal tubular fitting receptacle and transverse outwardly projecting protuberances on said fingers, said fingers and the receptacle interior being formed cooperatively to wedgingly deflect said fingers radially inward during insertion of said socket tube until said fingers are free to snap outwardly with said protuberances abutted to said shoulder in the fully inserted position of said socket tube.

6. The combination defined in claim 5 wherein said terminal tubular fitting receptacle comprises a substantially cylindrical entrance chamber of predetermined diameter adjoining a substantially cylindrical intermediate chamber of reduced diameter, and wherein said socket element exterior is substantially cylindrical and slidably fitted snugly in said entrance chamber, and said shank portion of said socket tube comprises a substantially cylindrical exterior slidably fitted in said intermediate chamber, said terminal tubular fitting receptacle further comprising an inner chamber adjoining said intermediate chamber through an abrupt change of diameter forming said annular shoulder.

7. The combination defined in claims 1 or 2 wherein said socket tube has a threaded exterior cylindrical portion spaced axially from said socket means, and said terminal tubular fitting has a complementally threaded interior cylindrical wall engageable by said socket tube threaded portion.

8. The combination defined in claim 1 wherein said socket means forming said hollow ball-and-socket joint socket element comprises a semi-spherical socket portion at said one end of said shank portion of said socket tube and a resiliently deformable lock ring cooperably engageable with said socket portion to form a two-piece socket element engageable about said ball element of said support tube, said terminal tubular fitting further including retaining means whereby said lock ring is retentively engaged upon said lock ring being deformably inserted into said receptacle in cooperable engagement with said socket portion of said socket tube, said lock ring thereby operating to retain said support tube and said socket tube in said receptacle.

9. The combination defined in claim 8 wherein said retaining means comprises an annular groove in the interior surface of said receptacle adjacent the open end of said receptacle and said lock ring includes an outwardly flanged edge portion retentively engageable with said annular groove.

10. The combination defined in claim 9 wherein said socket tube has an end portion attached to said shank portion opposite said socket portion comprising a plurality of circumferentially spaced substantially longitudinally projecting resiliently deflectable fingers, the interior of said terminal tubular fitting and the projecting ends of said fingers having cooperable locking elements interengageable by insertion of said socket tube into said terminal tubular fitting receptacle, said locking element thereby locking said socket tube into said fitting.

11. The combination defined in claim 10 wherein said cooperable locking elements include a transverse annular shoulder formed in said terminal tubular fitting receptacle and transverse outwardly projecting protuberances on said fingers, said fingers and said receptacle being cooperatively formed to wedgingly deflect said fingers radially inwardly during insertion of said socket tube into said receptacle until said fingers are free to snap outwardly with the protuberances abutted to said shoulder in the fully inserted position of said socket tube.

12. The combination defined in claim 11 wherein said interior surface of said terminal tubular fitting comprises a substantially cylindrical entrance chamber of predetermined diameter adjoining a substantially cylindrical intermediate chamber of reduced diameter, and wherein the exterior surfaces of said socket portion of said socket tube and said lock ring are substantially cylindrical and slidably fittable snugly in said entrance chamber, and said socket tube shank portion and end portion are substantially cylindrical and slidably fittable in said intermediate chamber.

13. The combination defined in claim 12 wherein said terminal tubular fitting receptacle comprises a substantially cylindrical entrance chamber of predetermined diameter adjoined by an annular connecting shoulder to a substantially cylindrical intermediate chamber of reduced diameter, and wherein said cooperable socket portion and lock ring are substantially cylindrical and slidably fittable snugly in said entrance chamber, said socket tube shank portion and end portion being substantially cylindrical and slidably fittable snugly in said intermediate chamber, said terminal tubular fitting receptacle further comprising an inner chamber adjoining said intermediate chamber through an abrupt change of diameter to form said transverse annular shoulder.

14. The combination defined in claim 13 further comprising a resilient O-ring emplaceable between said annular connecting shoulder of said receptacle interior surface and said socket portion of said socket tube to resiliently urge said socket portion against said cooperably engageable lock ring to maintain said two-piece socket element in integral engagement about said support tube ball element.

* * * * *